(12) United States Patent
Yakymets et al.

(10) Patent No.: US 12,148,107 B2
(45) Date of Patent: Nov. 19, 2024

(54) METHODS FOR HYBRID VIRTUAL WORKPLACE INTEGRATION AND DEVICES THEREOF

(71) Applicant: Jones Lang LaSalle IP, Inc., Chicago, IL (US)

(72) Inventors: Bogdan Yakymets, Warsaw (PL); Ngoc Anh Nguyen, Warsaw (PL); Krzysztof Moscibroda, Warsaw (PL); Triinu Gajda, Warsaw (PL); Marta Dydek, Kołbiel (PL)

(73) Assignee: Jones Lang LaSalle IP, Inc., Chicago, IL (US)

( * ) Notice: Subject to any disclaimer, the term of this patent is extended or adjusted under 35 U.S.C. 154(b) by 164 days.

(21) Appl. No.: 18/084,417

(22) Filed: Dec. 19, 2022

(65) Prior Publication Data
US 2024/0203064 A1 Jun. 20, 2024

(51) Int. Cl.
*G06T 19/00* (2011.01)
*G06F 3/0481* (2022.01)
*H04L 51/04* (2022.01)

(52) U.S. Cl.
CPC ......... *G06T 19/006* (2013.01); *G06F 3/0481* (2013.01); *H04L 51/04* (2013.01)

(58) Field of Classification Search
CPC ............................ G06T 19/006; G06F 3/0481
See application file for complete search history.

(56) References Cited

U.S. PATENT DOCUMENTS

2024/0078642 A1* 3/2024 Son .................. G06F 3/011
2024/0203075 A1* 6/2024 Rintel ................ G06T 19/20

* cited by examiner

Primary Examiner — Grace Q Li
(74) Attorney, Agent, or Firm — Troutman Pepper Hamilton Sanders LLP

(57) ABSTRACT

Methods, non-transitory computer readable media, and virtual workplace management devices are disclosed that obtain and store virtual workplace data and a avatars for users. The virtual workplace data includes images captured at physical locations associated with physical rooms of a workplace. An immersive virtual workplace environment is provided to a remote user device for display and includes a first avatar corresponding to a first user associated with the remote user device and virtual rooms corresponding to the physical rooms. The presence of a second user within a physical room corresponding to a virtual room is determined based on occupancy data following a received request to move the first avatar within the virtual room. The virtual room is modified to include a second avatar associated with the second user. An interaction is facilitated between the first and second users following selection of an interaction element displayed proximate the virtual room.

18 Claims, 8 Drawing Sheets

METHODS FOR HYBRID VIRTUAL WORKPLACE INTEGRATION AND DEVICES THEREOF

FIELD

This technology generally relates to immersive virtual environments and, more particularly, to methods and devices for hybrid virtual workplace integration to facilitate improved digital collaboration between coworkers.

BACKGROUND

Workers in various industries are increasingly working remotely or in a hybrid capacity with some portion of their duties performed remotely (e.g., from home) and another portion performed in a physical office space or other workplace shared with colleagues who also may split their time working in various locations. While remote and hybrid working arrangements have many benefits, they can also be challenging and isolating. Many workers have reported an increasing inability to maintain strong working and personal interactions and relationships with coworkers, which can have a negative impact on collaboration and the mission and productivity of the association organization.

Current technology available to address the shortcomings of remote and hybrid work includes video conferencing, which requires an intentional connection between two or more parties and does not allow for various types of collaboration and interactions that may occur in a physical workplace environment (e.g., in a kitchen, hallway, or break room). Video conferencing also does not close the gap with respect to the experience of a remote worker because it does not provide any context regarding the physical workplace (e.g., activities, meeting room schedules or occupants, or employee alerts).

Conversely, current computer-simulated environments or virtual worlds do not provide a significant connection to the physical world. With current technology, workers could create avatars and move the avatars in virtual environments, but these environments are detached from activity occurring in the physical workplace. For example, a remote worker with an avatar in a virtual environment would not be aware of a spontaneous birthday celebration for a coworker occurring in a kitchen. Accordingly, current technology fails to effectively facilitate communication and collaboration between remote and on-site coworkers.

SUMMARY

A method for hybrid virtual workplace integration is disclosed that is implemented by one or more virtual workplace management devices and includes obtaining and storing virtual workplace data and avatars for users. The virtual workplace data comprises images captured at physical locations within a workplace. An immersive virtual workplace environment is provided to a remote user device for display. The immersive virtual workplace environment is generated based on the virtual workplace data and includes virtual rooms corresponding to physical rooms of the workplace and a first one of the avatars corresponding to a first one of the users associated with the remote user device. The presence of a second one of the users within one of the physical rooms corresponding to one of the virtual rooms is determined based on physical occupancy data following a request received from the remote user device to move the first one of the avatars within the one of the virtual rooms. The one of the virtual rooms is modified to include a second one of the avatars associated with the second one of the users. An interaction between the first and second ones of the users is facilitated in response to a message received from the remote user device following selection of an interaction element displayed proximate the one of the virtual rooms.

A virtual workplace management device is disclosed that includes memory including programmed instructions stored thereon and one or more processors configured to execute the stored programmed instructions to obtain and store virtual workplace data and avatars for users. The virtual workplace data comprises images captured at physical locations within a workplace. An immersive virtual workplace environment is provided to a remote user device for display. The immersive virtual workplace environment is generated based on the virtual workplace data and includes virtual rooms corresponding to physical rooms of the workplace and a first one of the avatars corresponding to a first one of the users associated with the remote user device. The presence of a second one of the users within one of the physical rooms corresponding to one of the virtual rooms is determined based on physical occupancy data following a request received from the remote user device to move the first one of the avatars within the one of the virtual rooms. The one of the virtual rooms is modified to include a second one of the avatars associated with the second one of the users. An interaction between the first and second ones of the users is facilitated in response to a message received from the remote user device following selection of an interaction element displayed proximate the one of the virtual rooms.

A non-transitory computer readable medium having stored thereon instructions for hybrid virtual workplace integration is disclosed that includes executable code that, when executed by one or more processors, causes the one or more processors to obtain and store virtual workplace data and avatars for users. The virtual workplace data comprises images captured at physical locations within a workplace. An immersive virtual workplace environment is provided to a remote user device for display. The immersive virtual workplace environment is generated based on the virtual workplace data and includes virtual rooms corresponding to physical rooms of the workplace and a first one of the avatars corresponding to a first one of the users associated with the remote user device. The presence of a second one of the users within one of the physical rooms corresponding to one of the virtual rooms is determined based on physical occupancy data following a request received from the remote user device to move the first one of the avatars within the one of the virtual rooms. The one of the virtual rooms is modified to include a second one of the avatars associated with the second one of the users. An interaction between the first and second ones of the users is facilitated in response to a message received from the remote user device following selection of an interaction element displayed proximate the one of the virtual rooms.

This technology provides a number of advantages including methods, non-transitory computer readable media, and virtual workplace management devices that advantageously leverage a hybrid virtual work to bridge the collaboration and integration gap between remote and on-site coworkers. This technology creates a virtual environment with avatars for both on-side and remote coworkers. Remote coworkers can use a local application to move respective avatars within the virtual environment and avatars for on-site workers are disposed in virtual locations (e.g., rooms) that correspond to physical locations at which devices (e.g., mobile devices) associated with the on-side workers are determined to be located within a physical workplace based on sensors in the physical workplace or another type of tracking.

When co-located within the virtual environment, remote and on-site workers can view the associated avatars and engage interaction elements within respective mobile applications, for example, to initiate communication, such as a text-based chat, audio call, or video conference, for example, with other coworkers. Additionally, the mobile application can integrate with on-site facility management systems to provide information to coworkers, including those located remotely, regarding conference room bookings, available resources, and workplace activities, for example, to further bridge the gap between remote and on-site coworkers.

DETAILED DESCRIPTION

Figure 1:
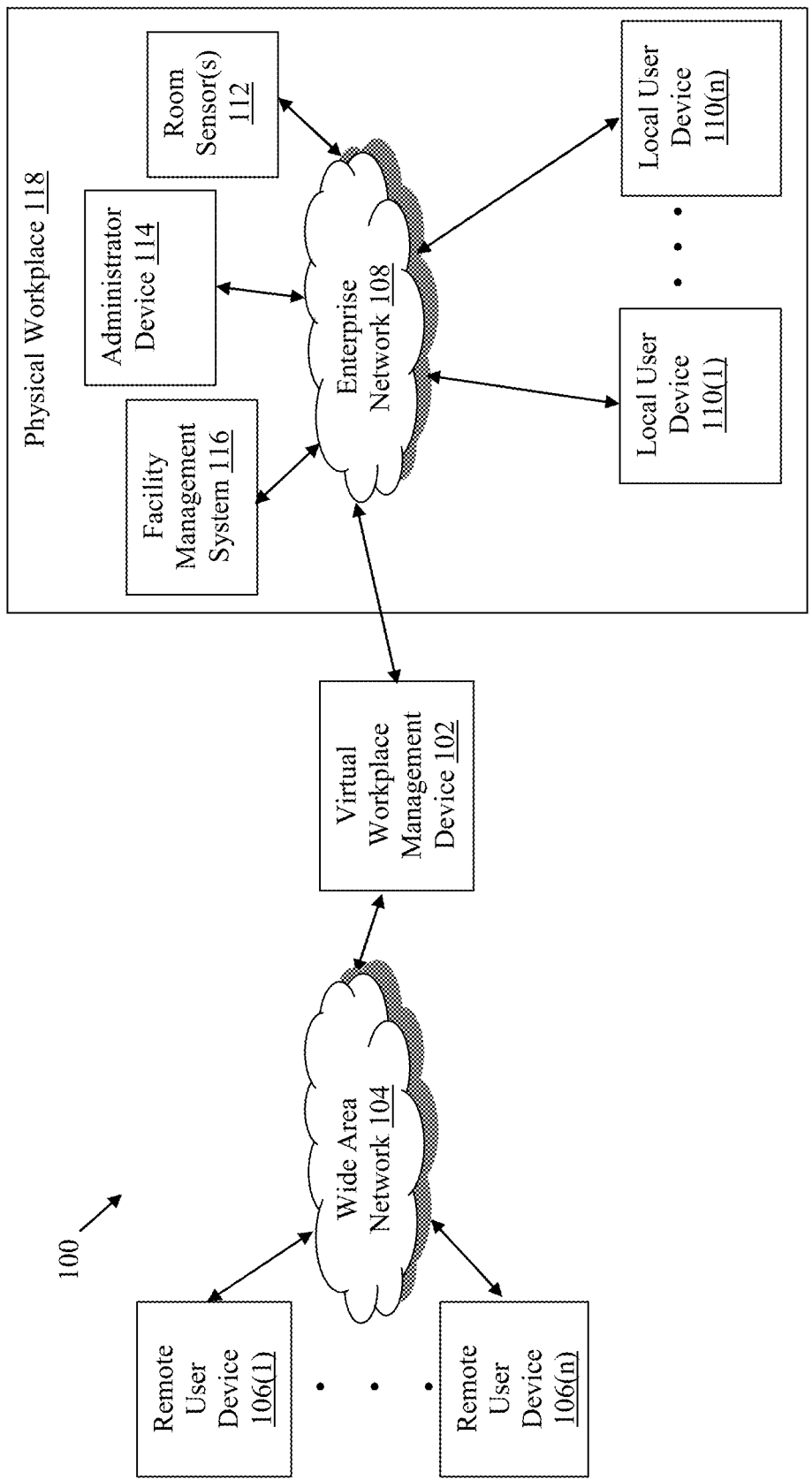
FIG. 1 is a block diagram of an exemplary network environment with a virtual workplace management device.

Referring to FIG. 1, an exemplary network environment 100 is illustrated that includes a virtual workplace management device 102 coupled, via a wide area network (WAN) 104, to a remote user devices 106(1)-106(n) and, via an enterprise network 108, to local user devices 110(1)-110(n), room sensor(s) 112, an administrator device 114, and a facilitate management system 116, each of which is located within a physical workplace 118 in this example. The network environment 100 may include other network devices such as one or more routers or switches, for example, which are known in the art and thus will not be described herein. This technology provides a number of advantages including methods, non-transitory computer readable media, and work order analysis server devices that more effectively facilitate digital collaboration between remote and on-site coworkers using a hybrid virtual environment.

In this particular example, the remote user devices 106(1)-106(n), facility management system 116, administrator device 114, local user devices 110(1)-110(n), room sensor(s) 112, and virtual workplace management device 102 are disclosed in FIG. 1 as dedicated hardware devices. However, one or more of the remote user devices 106(1)-106(n), facility management system 116, administrator device 114, local user devices 110(1)-110(n), room sensor(s) 112, or virtual workplace management device 102 can also be implemented in software within one or more other devices in the network environment 100. As one example, the virtual workplace management device 102, as well as any of its components or applications, can be implemented as software executing on the facility management system 116, and many other permutations and types of implementations and network topologies can also be used in other examples.

Figure 2:
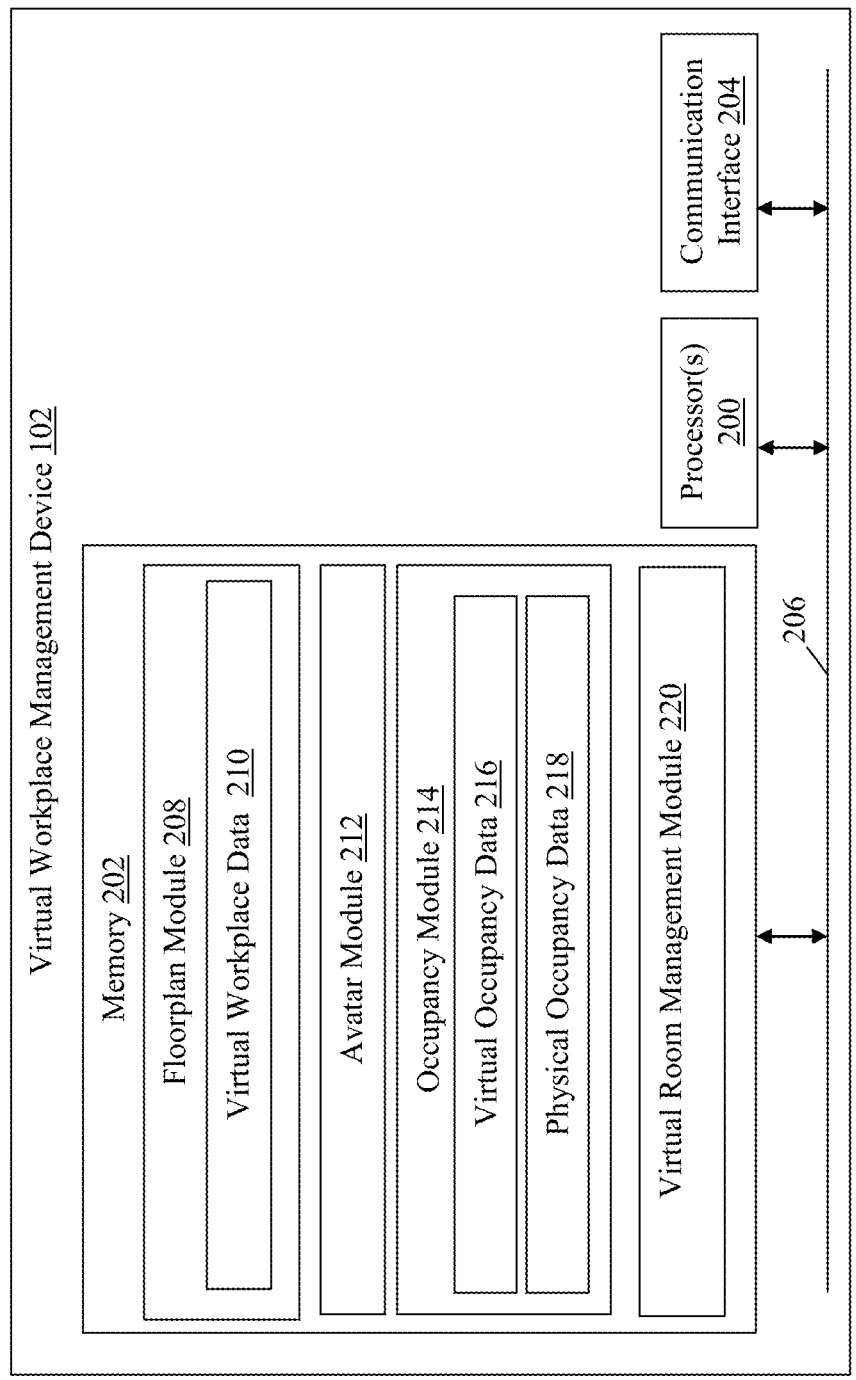
FIG. 2 is a block diagram of an virtual workplace management device.

Referring to FIGS. 1-2, the virtual workplace management device 102 of the network environment 100 may perform any number of functions, including facilitating definition of avatars, generating a hybrid virtual environment, and facilitating digital communications between users of the remote user devices 106(1)-106(n) and users of the local user devices 110(1)-110(n), as described and illustrated in more detail below. The virtual workplace management device 102 in this example includes processor(s) 200, a memory 202, and a communication interface 204, which are coupled together by a bus 206, although the virtual workplace management device 102 can include other types or numbers of elements in other configurations.

Figure 4:
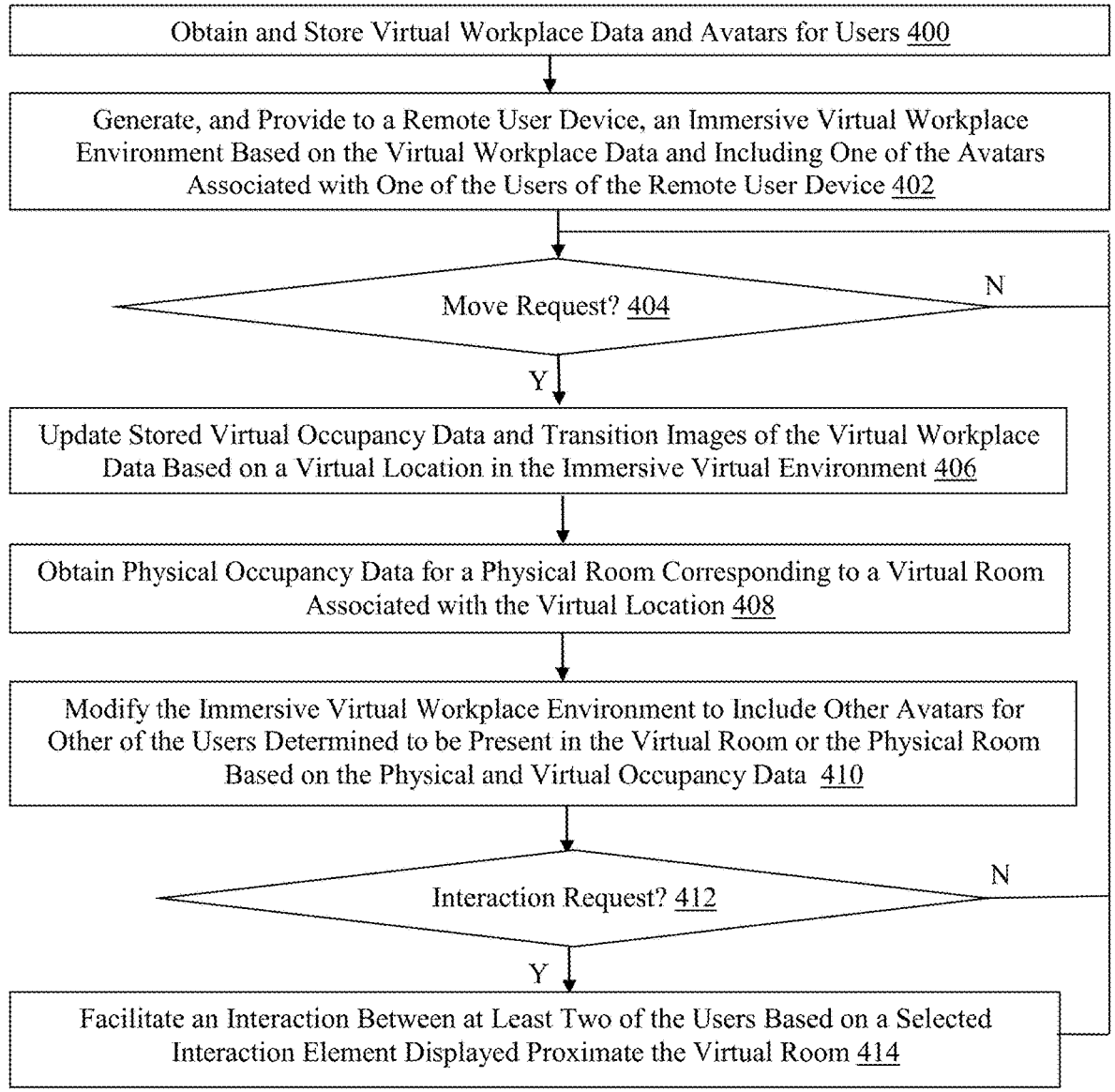
FIG. 4 is a flowchart of an exemplary method for hybrid virtual workplace integration.

The processor(s) 200 of the virtual workplace management device 102 may execute programmed instructions stored in the memory 202 of the virtual workplace management device 102 for any number of the functions described and illustrated herein (e.g., with reference to FIG. 4). The processor(s) 200 may include one or more central processing units (CPUs) or general purpose processors with one or more processing cores, for example, although other types of processor(s) can also be used.

The memory 202 of the virtual workplace management device 102 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 200, can be used for the memory 202.

Accordingly, the memory 202 can store applications that can include computer executable instructions that, when executed by the virtual workplace management device 102, cause the virtual workplace management device 102 to perform actions, such as to transmit, receive, or otherwise process network messages and requests, for example, and to perform other actions described and illustrated below with reference to FIGS. 3-8. The application(s) can be implemented as components of other applications, operating system extensions, and/or plugins, for example.

Further, the application(s) may be operative in a cloud-based computing environment with access provided via a software-as-a-service model. The application(s) can be executed within or as virtual machine(s) or virtual server(s) that may be managed in a cloud-based computing environment. Also, the application(s), and even the virtual workplace management device 102 itself, may be located in virtual server(s) running in a cloud-based computing environment rather than being tied to specific physical network computing devices. Also, the application(s) may be running in virtual machines (VMs) executing on the virtual workplace management device 102 and managed or supervised by a hypervisor.

In this particular example, the memory 202 includes a floorplan module 208 with virtual workplace data 210, an avatar module 212, an occupancy module 214 with virtual occupancy data 216 and physical occupancy data 218, and a virtual room management module 220. The floorplan module 208 stores virtual workplace data 210, which includes images captured at various locations within a physical workplace 118, including within at least a subset of rooms of the physical workplace 118 (e.g., kitchen, break room, and/or conference room).

The images can be capture at multiple angles to facilitate a three-dimensional view when an avatar is moved to a virtual location in an immersive virtual workplace environment that corresponds with a physical location in the physical workplace 118, for example. The floorplan module 208 can also include a two-dimensional floorplan or layout of the physical workplace 118 optionally including the location of various rooms and/or furniture/appliances disposed within those rooms. Accordingly, the floorplan module facilitates the generation or an immersive virtual workplace environment based on the virtual workplace data 210 and facilitate avatar movement within the environment, as explained in more detail below.

The avatar module 212 provides an interface to the users of the remote and local user devices 106(1)-106(n) and 110(1)-110(n) to generate avatars based on a desired virtual or digital appearance. In other examples, the avatar module can generate avatars automatically based on stored user images, for example, and/or using default avatar specifications. The generated avatars are stored in the memory 202 by the avatar module 212 associate with a unique identifier of the associate user.

The occupancy module 214 in this example is configured to maintain updated virtual occupancy and physical occupancy data 216 and 218. The virtual occupancy data 216 includes an indication of avatars associated with users of the remote user devices 106(1)-106(n) that are currently within each of the rooms of the generated hybrid virtual environment. Accordingly, the occupancy module 214 tracks avatar movement facilitated by the floorplan module 208 and maintains a database, table, or other data structure that includes an indication of each room of the immersive virtual workplace environment associated with a unique identifier of avatar(s) and/or associated user(s) currently present in those rooms.

The physical occupancy data 218 includes an indication of users of the local user device 110(1)-110(n) that are currently present within each room of the physical workplace 118. Accordingly, the occupancy module 214 can be configured to receive data from the room sensor(s) 112, such as a badge scanning, that can provide information regarding an on-site worker entering a room of the physical workplace 118. In another example, the occupancy module 214 can receive information manually entered via an application executed by one of the local user devices 110(1)-110(n) indicating that the associated user is currently within a particular room of the physical workplace 118.

In yet another example, the occupancy module 214 can use an indoor geolocation tracking system (e.g., a mesh network), optionally along with the room sensor(s) (e.g., beacons), at the physical workplace 118 that is configured to ping, or receive a ping from, the local user devices 110(1)-110(n), which can be correlated with rooms of the physical workplace 118. Other methods of determining a location of users of the local user devices 110(1)-110(n) within the physical workplace 118 can also be used. Accordingly, the occupancy module 214 stores a correlation of remote user identities with virtual room indicators, local user identities with physical room indicators, and virtual room indicators with physical room indicators, which can collectively be used to determine the particular occupants for which an associated avatar should be provided in the generated immersive virtual workplace environment provided to the remote and/or local user devices 106(1)-106(n) and 110(1)-110(n), as described and illustrated in more detail below.

The virtual room management module 220 uses the virtual and physical occupancy data 216 and 218 and the virtual workplace data 210 to generate graphical, virtual rooms of the immersive virtual workplace environment along with selectable interaction elements to facilitate coworker collaboration. In particular, the virtual room management module 220 can generate a virtual room interface that includes a graphical representation of a virtual room generated from the virtual workplace data 210, avatars retrieved from the avatar module 212 that correspond to users determined from the virtual and physical occupancy data 216 and 218, and interaction elements.

The interaction elements, when selected by a user of the remote or local user devices 106(1)-110(n), facilitate a chat, audio, or video communication between two or more users present in the virtual room of the immersive virtual workplace environment and/or the corresponding physical room of the physical workplace 118. Optionally, an indication of whether an avatar is associated with a remote or on-site user can be provided no the virtual room interface proximate the respective avatars. Additional context data associated with the physical room corresponding to the virtual room can also be provided via the virtual room interface, such as booking information retrieved from the facilitate management system 116 or temperature information retrieved from the room sensor(s) 112, for example.

The communication interface 204 of the virtual workplace management device 102 operatively couples and communicates between the virtual workplace management device 102, remote user devices 106(1)-106(n), facility management system 116, administrator device 114, room sensor(s) 112, and local user devices 110(1)-110(n), which are coupled together at least in part by the WAN 104 and enterprise network 108, although other types or numbers of communication networks or systems with other types or numbers of connections or configurations to other devices or elements can also be used.

By way of example only, the WAN 104 and/or enterprise network 108 can use TCP/IP over Ethernet and industry-standard protocols, although other types or numbers of protocols or communication networks can be used. The WAN 104 and/or enterprise network 112 108 this example can employ any suitable interface mechanisms and network communication technologies including, for example, Ethernet-based Packet Data Networks (PDNs).

While the virtual workplace management device 102 is illustrated in this example as including a single device, the virtual workplace management device 102 in other examples can include a plurality of devices each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the virtual workplace management device 102. Additionally, one or more of the devices that together comprise the virtual workplace management device 102 in other examples can be standalone devices or integrated with one or more other devices or apparatuses.

The facility management system 116 of the network environment 100 includes processor(s), a memory, and a communication interface, which are coupled together by a bus or other communication link, although other numbers and types of network devices could be used. The facility management system 116 in this example can host work order management applications, room scheduling applications, and/or any other type of application or data relates to management of the physical workplace 118. Optionally, the room sensor(s) 112 can be coupled directly to the facilitate management system 116 via the enterprise network 108 or another network within the physical workplace 118 in some examples. Accordingly, the room sensor(s) can include badge scanning devices, other types of occupancy sensors, temperature sensors, motion sensors, or any other type of sensor capable of obtaining and communication information regarding the physical environment within the physical workplace 118.

Each of the remote user devices 106(1)-106(n), local user devices 110(1)-110(n), and administrator device 114 of the network environment 100 includes processor(s), a memory, a communication interface, user input device(s), an audio input/output device, an imaging device (e.g., video camera), and/or a display device, which are coupled together by a bus or other communication link, although other numbers and types of network devices could be used. The remote and local user devices 106(1)-106(n) and 110(1)-110(n) can be mobile devices, such as smartphones, and/or tablet or laptop computing devices, for example, that execute applications configured to communicate with the virtual workplace management device 102 for the presentation of, and interaction with, the hybrid virtual environment generated and provided by the virtual workplace management device 102. The remote and local user devices 106(1)-106(n) and 110(1)-110(n) are also configured to facilitate digital communications between users of those devices.

The administrator device 114 in this example is configured to provide the virtual workplace management device 102 with configuration information, such as the virtual workplace data 210, identification information for users, access information for the facility management system 116, and other types of contextual and configuration information associated with the physical workplace 118, for example. In some examples, one or more of the remote or local user devices 106(1)-106(n) and 110(1)-110(n) can be used as the administrator device 114.

Although the exemplary network environment 100 with the remote user devices 106(1)-106(n), facility management system 116, local user devices 1(1)-110(n), room sensor(s) 112, administrator device 114, virtual workplace management device 102, WAN 104, and enterprise network 108 are described and illustrated herein, other types or numbers of systems, devices, components, or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network environment 100, such as the remote user devices 106(1)-106(n), facility management system 116, local user devices 1(1)-110(n), room sensor(s) 112, administrator device 114, or virtual workplace management device 102, for example, may be configured to operate as virtual instances on the same physical machine. In other words, one or more of the remote user devices 106(1)-106(n), facility management system 116, local user devices 1(1)-110(n), room sensor(s) 112, administrator device 114, or virtual workplace management device 102 may operate on the same physical device rather than as separate devices communicating through WAN 104 and/or enterprise network 108. Additionally, there may be more or fewer user devices, facility management systems, vendor devices, or work order analysis server devices than illustrated in FIG. 1.

The examples of this technology may also be embodied as one or more non-transitory computer readable media having instructions stored thereon, such as in the memory 202, for one or more aspects of the present technology, as described and illustrated by way of the examples herein. The instructions in some examples include executable code that, when executed by one or more processors, such as the processor(s) 200, cause the processors to carry out steps necessary to implement the methods of the examples of this technology that are described and illustrated herein.

Figure 3:
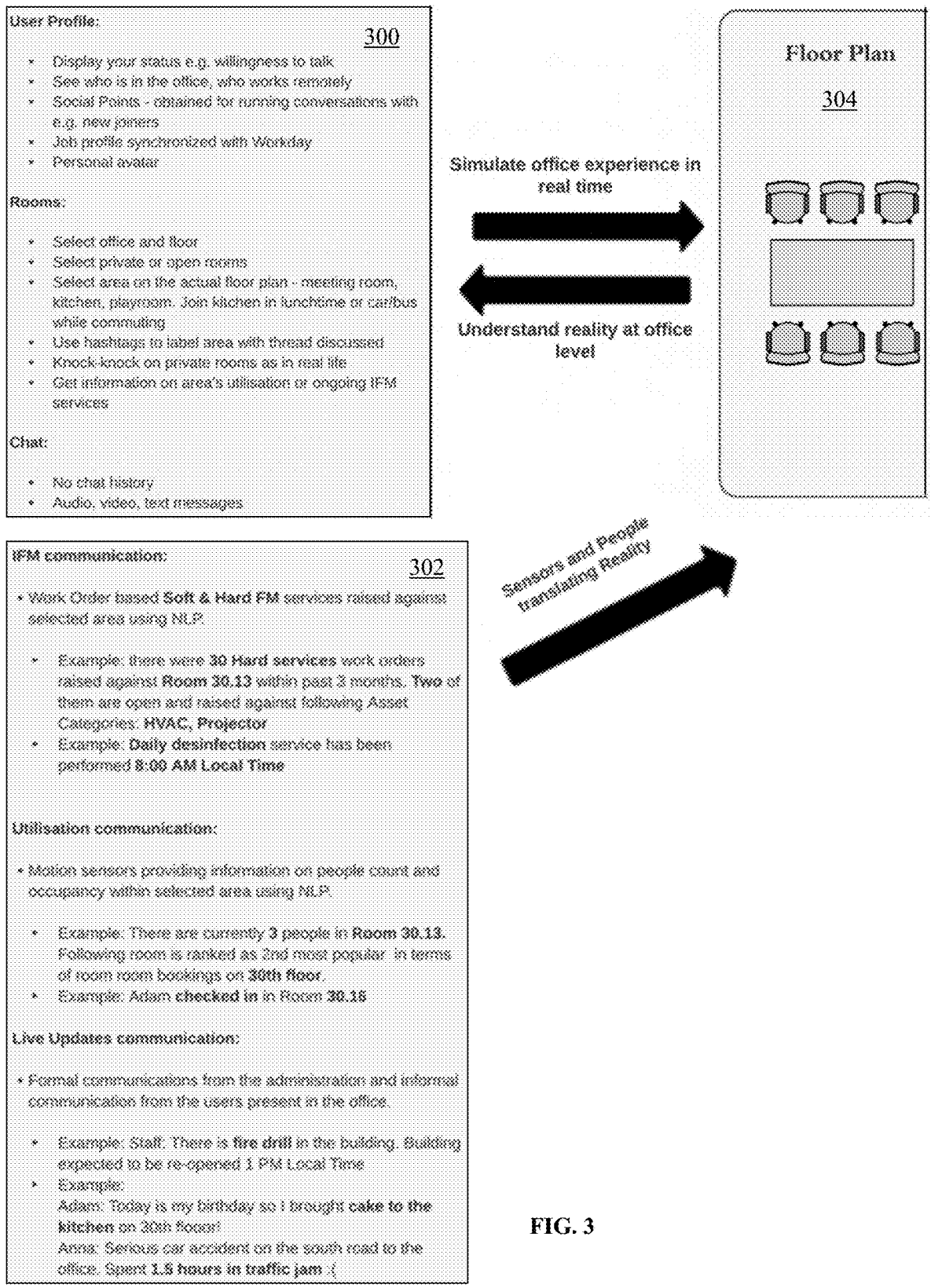
FIG. 3 is a block diagram illustrating an overview of virtual and reality layers of a hybrid virtual environment.

Referring to FIG. 3, a block diagram illustrating an overview of a virtual layer 300 and a reality layer 302 coupled together by a floorplan 304 of an immersive virtual workplace environment is illustrated. In this example, the reality layer 302, which includes the devices and enterprise network 108 located on-site within the physical workplace 118, sends sensor data and other information resulting from users translating reality, such as activity occurring within the physical workplace 118, to the floorplan 304, which is hosted by the virtual workplace management device 102.

For example, users of the local user devices 110(1)-110(n) associated with the reality layer 302 can submit work orders to the facility management system 116 for issues identified within the physical workplace 118 and generate formal and informal communications regarding fire drills or birthday celebrations, for example, and motion sensors can provide total occupancy information, all of which is used by the virtual workplace management device 102 to shrink the gap between remote and on-site workers, as explained in more detail below.

Contemporaneously with the receipt of translated reality from the reality layer 302, the virtual workplace management device 102 is simulating an office experience in real-time via an immersive virtual workplace environment provided to the remote user devices 106(1)-106(n) of the virtual layer 300 to help users of the remote user devices 106(1)-106(n) understand the reality occurring at the physical workplace 118. Accordingly, the users of the remote user devices 106(1)-106(n) may be interfacing with the virtual workplace management device 102 via a local application, for example, to submit a status, determine who is in the office, determine who may be working remotely, and generate and move a personal avatar around the hybrid virtual environment.

In particular, a user of one of the remote user devices 106(1)-106(n) can select an office, floor, private room, public room, or an area on the floorplan of the physical workplace 118 that is reproduced virtually within the virtual hybrid environment. Upon entering a virtual location, the user of the one of the remote user devices 106(1)-106(n) can learn contextual information regarding the corresponding physical location in the physical workplace 118 and/or digitally knock on a door or address another coworker to see if someone may be available to collaborate via text, audio, or video, for example, as will now be described below in more detail.

Referring to FIG. 4, a flowchart of an exemplary method for hybrid virtual workplace integration is illustrated. In step 400 in this example, the virtual workplace management device 102 obtains and stores the virtual workplace data 210 and avatars for users of the remote and local user devices 106(1)-106(n) and 110(1)-110(n). The virtual workplace data includes images captured at physical locations within the physical workplace 118 and the virtual workplace data can be obtained via an interface provided to the administrator device 114, for example. As explained above, the avatars can be default, selected, generated from user images, and/or graphically designed by users to have desired characteristics. The avatars can be stored with an identifier of an associated user (e.g., an employee name or ID).

In step 402, the virtual workplace management device 102 generates, and provides to a requesting one of the remote user devices 106(1)-106(n) for display an immersive virtual workplace environment. The immersive virtual workplace environment is generated based on the virtual workplace data in this example. The images of the virtual workplace data are stored with an identifier of an associated location within a floorplan of the physical workplace 118, which can be correlated with a corresponding virtual location to facilitate generation of the immersive virtual workplace environment. When a user moves an associated avatar to one of the virtual location, the images associated with the corresponding physical location can be displayed to the one of the remote user devices 106(1)-106(n) associated with the user.

In this particular example, the immersive virtual workplace environment includes virtual rooms corresponding to physical rooms of the physical workplace 118. Each of the physical and corresponding virtual locations can be associated with one of the physical rooms of the physical workplace 118 and/or multiple physical and corresponding virtual locations can be associated with one or more of the physical rooms of the physical workplace 118. The immersive virtual workplace environment is also generates to include one of the avatars corresponding to the user associated with the one of the remote user devices 106(1)-106(n).

In some examples, the request for the immersive virtual workplace environment can be initiated following a user login via an application executed at the one of the remote user devices 106(1)-106(n), which causes an identifier for the remote user to be communicated to the virtual workplace management device 102. The identifier for the remote user can then be correlated by the avatar module 212 to retrieve the corresponding avatar, which is displayed via the generated and provided immersive virtual workplace environment In step 404, the virtual workplace management device 102 determines whether a move request is received from the one of the remote user devices 106(1)-106(n). The request can be a request to move the viewpoint (e.g., of the associated avatar) received via an interaction with a virtual location within the provided immersive virtual workplace environment with an input device of the one of the remote user devices 106(1)-106(n), for example, although the move request can be received in other ways in other examples.

Figure 5:
FIG. 5 is an exemplary virtual workplace interface that facilitates movement according to stored virtual workplace data.

Referring to FIG. 5, an exemplary virtual workplace interface 500 that facilitates movement according to stored virtual workplace data is illustrated. In this example, the virtual workplace interface 500 is provided by the virtual workplace management device 102 via an application executed by the remote user device 106. The virtual workplace interface 500 includes an indication of a virtual location 502 to which a user of the remote user device 106 can move, in response to selecting the virtual location 502, in order to transition locations within the immersive virtual workplace environment.

Figure 6:
FIG. 6 is an exemplary virtual floorplan interface illustrating virtual and physical occupancy data and a chat panel for a virtual room.

Referring to FIG. 6 is an exemplary virtual floorplan interface 600 illustrating virtual and physical occupancy data 602 and a chat panel 604 for a virtual room is illustrated. In this example, a two-dimensional floorplan is illustrated that can be navigated by a user of the remote user device to display occupants of various rooms. In this particular example, the virtual floorplan interface 600 is at a position of the kitchen of the physical workplace 118 and a kitchen table is illustrated with graphical indications of the occupants of the kitchen table displayed.

Proximate the two-dimensional floorplan, virtual and physical occupancy data 602 is illustrated that in this particular examples shows that five users are currently physically located in the kitchen of the physical workplace 118 while three users are in the virtual kitchen of the immersive hybrid virtual environment. The virtual and physical occupancy data 602 can be obtained as described below with reference to steps 406 and 408 of FIG. 4, for example.

The chat panel 604 is provided via the virtual floorplan interface 600 to allow the occupants of the physical and virtual kitchen to communicate in a text-based chat format. Once the user has entered a room via the virtual workplace interface 500 or virtual floorplan interface 600, for example, the immersive virtual workplace environment can be updated to display the associated avatar, an example of which is described and illustrated below with reference to FIG. 7. Referring back to FIG. 4, if the virtual workplace management device 102 determines that a move request has not been received, then the No branch is taken back to step 404 and the virtual workplace management device 102 effectively waits for a request to move from the one of the remote user devices 106(1)-106(n). However, if the virtual workplace management device 102 determines that a move request has been received, then the Yes branch is taken to step 406.

In step 406, the virtual workplace management device 102 transitions in the provided immersive virtual workplace environment between two of the images of the virtual workplace data 210 (e.g., associated with the prior and subsequent virtual locations) in response to the received request. The received request includes a movement input received at a virtual location (e.g., virtual location 502) within the immersive virtual workplace environment and the virtual location corresponds to a physical location based on stored identifiers for those locations, for example. Based on the stored correlation, the virtual workplace management device 102 updates stored virtual occupancy data 216 for the virtual room associated with the correlated virtual and physical locations to reflect the presence of the avatar associated with the user of the one of the remote user devices 106(1)-106(n).

In step 408, the virtual workplace management device 102 obtains physical occupancy data for the physical room corresponding to the virtual room that includes the virtual location that was the destination of the move request received in step 404. In some examples, the occupancy module 214 periodically updates the physical occupancy data 218, which can be determined from the room sensor(s) 112 physical locations correlated to physical rooms and determined from the local user devices 110(1)-110(n) executing applications via which other instances of the immersive virtual workplace environment is provided for display, or location inputs received from the on-site users via the applications executed by the local user devices 110(1)-110(n) and including an indication of the physical rooms. Other methods for determining the physical occupancy data 218 can also be used in other examples.

In step 410, the virtual workplace management device 102 modifies the virtual room of the immersive virtual workplace environment to include other avatars for other of the users determined to be present in the virtual room or the corresponding physical room based on the virtual and physical occupancy data 216 and 218, as well as to include the avatar for the user of the one of the remote user devices 106(1)-106(n). The virtual workplace management device 102 also modifies the virtual room of the immersive virtual workplace environment to include a graphical indication proximate each of the avatars associated with remote or on-site users present in the virtual room or corresponding physical room, respectively, indicating that the associated users are remote or on-site. The determination regarding whether a user is remote or on-site is determined based on whether the corresponding identified for the user is within the stored virtual occupancy data 216 associated with the relevant virtual room or the physical occupancy data 218 associated with the relevant physical room that corresponds to the relevant virtual room.

Figure 7:
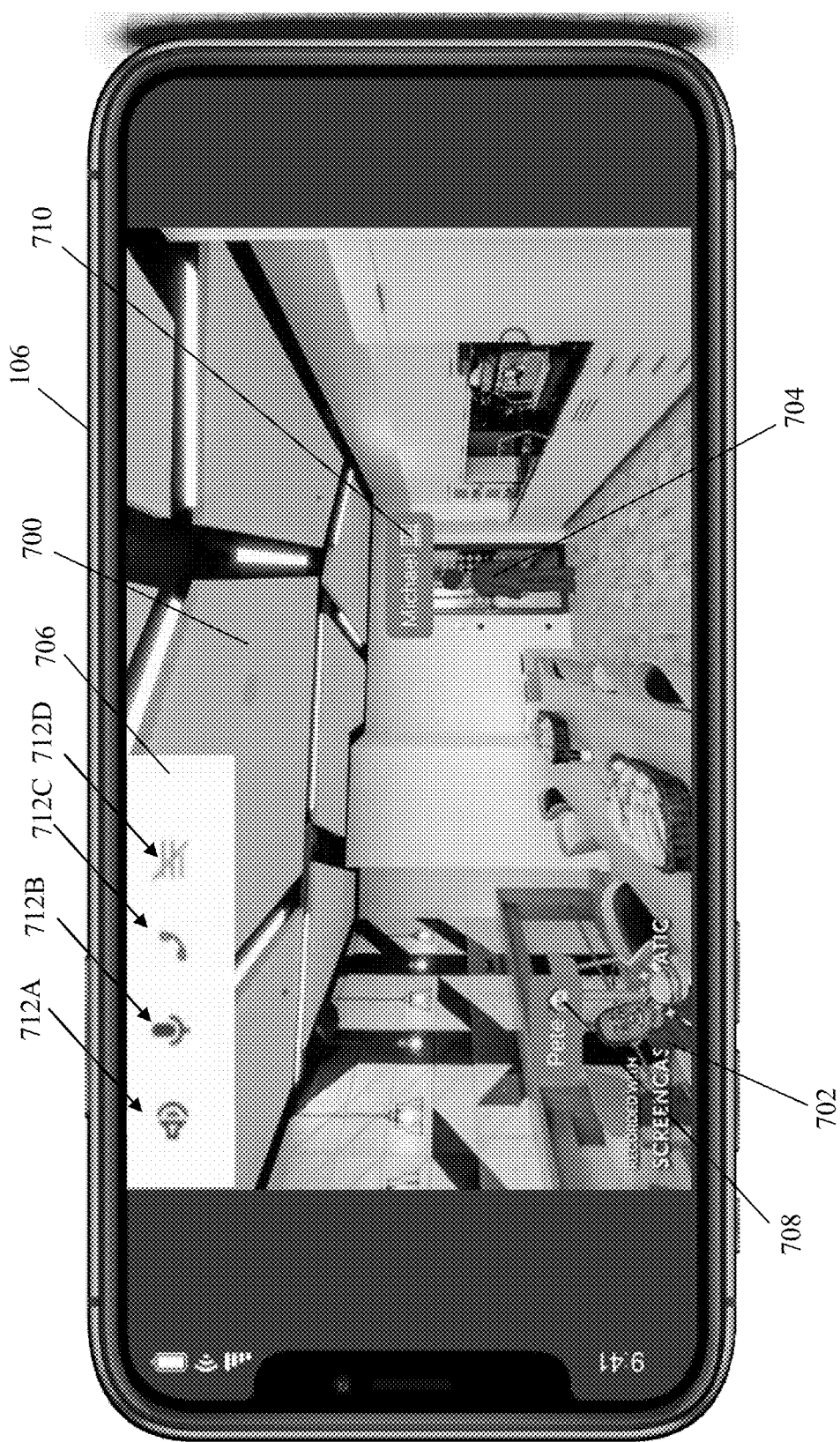
FIG. 7 is an exemplary virtual room interface with avatars for remote and on-site coworkers and selectable interaction elements.

Referring to FIG. 7, an exemplary virtual room interface 700 with avatars 702 and 704 for remote and on-site coworkers, respectively, and an interaction panel 706 is illustrated. In this example, Pete has entered the kitchen of the physical workplace 118 and the virtual workplace management device 102 updated the virtual room interface 700 displaying the immersive virtual workplace environment to include the associated avatar 702 after updating the virtual occupancy data 216. Because Pete is remote, a remote label 708 (e.g., a house or other graphical indication) is provided proximate the avatar 702.

The virtual workplace management device 102 also determined from the physical occupancy data 218 that Michael is physically in the kitchen in the physical workplace 118. Accordingly, the virtual room interface 700 displaying the immersive virtual workplace environment is updated to include the associated avatar 704. Additionally, because Michael is on-site, an on-site label 710 (e.g., an office or other graphical indication) is provided proximate the avatar 704, which quickly allows the user of the remote user device 106 (i.e., Pete) to determine that Michael is physically present in the physical kitchen corresponding to the virtual kitchen in which he is located.

The virtual room interface 700 also includes an interaction panel 706 with interaction elements 712A-D (e.g., buttons) that the user of the remote user device 106 can select to join the corresponding channel associated with the virtual room. For example, the user can select the microphone interaction element 712B to interact with the other users present in the virtual room (including those with an avatar in the virtual room as a result of their physical presence in the corresponding physical room). Accordingly, all of the users in the virtual and corresponding physical room can collaborate via an audio or other type of connection or channel hosted or established by the virtual workplace management device 102 for each of the rooms of the physical workplace 118.

In other examples, additional contextual information regarding the physical room corresponding to the displayed virtual room can also be provided via the virtual room interface 700. For example, the virtual workplace management device 102 can generate or update the virtual room interface 700 to include the temperature of the room, an indication of work orders submitted that are associated with equipment within the room, and/or any other information retrieved from the room sensor(s) 112 and/or facility management system 116, for example.

Referring back to FIG. 4, in step 412, the virtual workplace management device 102 determines whether an interaction request has been received. The interaction request can be received in response to a selection of an interaction element (e.g., interaction elements 712A-D) at the one of the remote user devices 106(1)-106(n), for example. If the virtual workplace management device 102 determines that an interaction request has not been received, then the No branch is taken back to step 404 and the virtual workplace management device 102 effectively waits for a move or interaction request. However, if the virtual workplace management device 102 determines in step 412 that an interaction request has been received, then the Yes branch is taken to step 414.

In step 414, the virtual workplace management device 102 facilitates an interaction between at least two users based on the selected interaction element displayed proximate the virtual room. For example, the virtual workplace management device 102 can facilitate a text-based chat interaction, and audio call interaction, or a video conference interaction based on the type of selected interface element. The interaction can be facilitated directly between another one or more of the users and/or with all users currently present physically or virtually in a corresponding room, for example.

Figure 8:
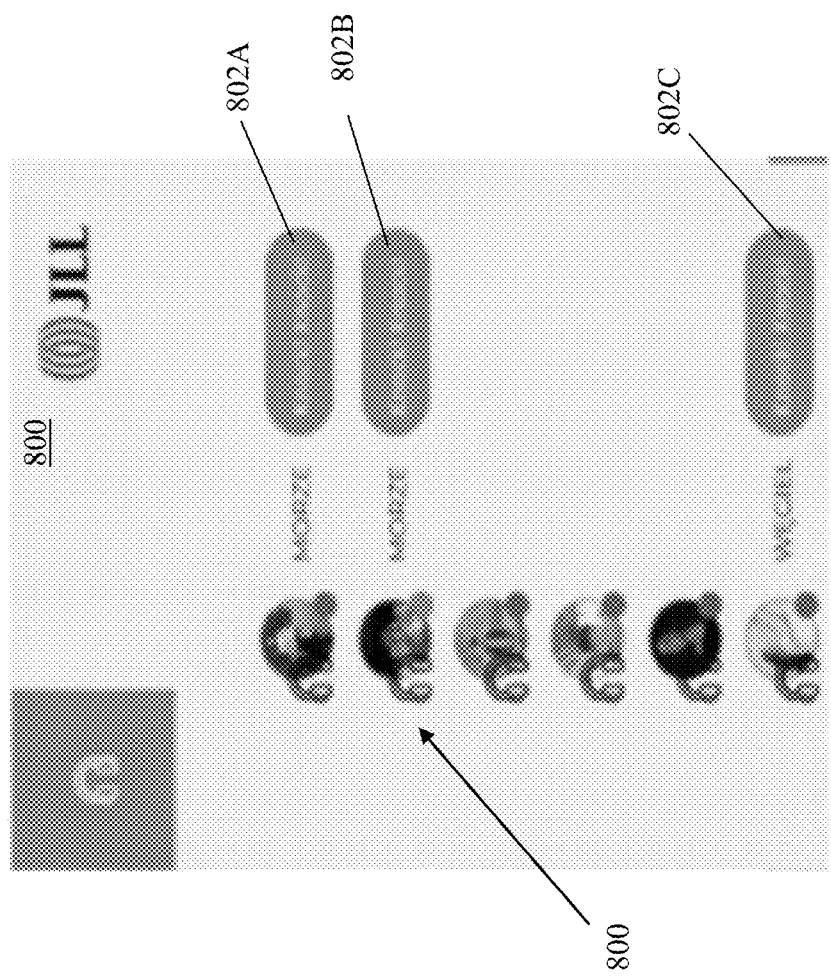
FIG. 8 is an exemplary collaboration interface that facilitates audio collaboration among remote and on-site coworkers.

Referring to FIG. 8, an exemplary collaboration interface 800 that facilitates audio collaboration among remote and on-site coworkers is illustrated. In this example, the collaboration interface 800 includes an indication of each of the avatars present in the virtual room, a graphical indication of the location of their corresponding users (i.e., remote or on-site) and optionally a knock button 802A-C. The knock button 802A-C can be provided for those users that have submitted a status via an associated application to indicate that they are willing to interact or communicate with other users. Selection of the knock button 802A-C can cause a message to be sent to the corresponding one of the remote or local user devices 106(1)-106(n) and 110(1)-110(n) indicating the request to communicate. Based on the response received from the corresponding one of the remote or local user devices 106(1)-106(n) and 110(1)-110(n), the virtual workplace management device 102 can establish a communication channel to facilitate an interaction between the users.

While exemplary interfaces showing avatars, graphical location indications, and interaction elements, among other features, other methods for facilitating an interaction between at least two users can also be used in other examples. Subsequent to facilitating the interaction in step 414, the virtual workplace management device 102 proceeds back to step 404. In other examples one or more of steps 400-414 can occur in parallel and/or in a different order. Steps 402-414 also can be performed for any number of the remote user devices 106(1)-106(n) in parallel. While the examples described and illustrated herein with reference to FIG. 4 are from the perspective of one of the remote user devices 106(1)-106(n), the steps corresponding to steps 402-414 also can be performed with respect to any number of the local user devices 110(1)-110(n).

As described and illustrated by way of the examples herein, this technology provides an improved immersive hybrid virtual workplace that allows remote workers to navigate a virtual environment that mirrors a physical environments, including with respect to physical workers present at particular locations and rooms of the physical environments. Remote workers can move to virtual rooms corresponding to physical rooms and ping on-site workers physically present in the physical rooms via applications executing on respective mobile devices. The intermediary virtual workplace management device 102 facilitate various types of digital communication channels to reduce the distance felt by remote workers and thereby facilitate improved morale, teamwork, communication, and collaboration within organizations.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for hybrid virtual workplace integration, the method implemented by one or more virtual workplace management devices and comprising:
   providing for display to a remote user device external to a workplace an immersive virtual workplace environment generated based on virtual workplace data, comprising images captured at physical locations within the workplace, and including virtual rooms corresponding to physical rooms of the workplace and a first avatar corresponding to a first user associated with the remote user device;
   modifying one of the virtual rooms to include the first avatar and a first graphical indication proximate the first avatar indicating that the first user is remote, and determining that a second user is present within one of the physical rooms corresponding to the one of the virtual rooms based on physical occupancy data, following a request received from the remote user device to move the first avatar within the one of the virtual rooms;
   modifying the one of the virtual rooms to include a second avatar associated with the second user and a second graphical indication proximate the second avatar indicating that the second user is local; and
   facilitating an interaction between the first and second users in response to a message received from the remote user device following selection of an interaction element displayed proximate the one of the virtual rooms.

2. The method of claim 1, wherein the interaction comprises an audio, video, or text-based chat interaction and the interaction element is displayed proximate the one of the virtual rooms within an application executed by the remote user device via which the immersive virtual workplace environment is provided for display on the remote user device.

3. The method of claim 1, further comprising obtaining the physical occupancy data from one or more of:
   a physical location correlated to the one of the physical rooms and determined from a local user device associated with the second user and executing an application via which another instance of the immersive virtual workplace environment is provided for display on the local user device; or
   a location input received from the second user via the application and comprising an indication of the one of the physical rooms.

4. The method of claim 1, further comprising transitioning between two of the images in response to the received request to move the first avatar, wherein the received request comprises a movement input received at a virtual location within the immersive virtual workplace environment and the virtual location corresponds to one of the physical locations.

5. The method of claim 1, further comprising generating the immersive virtual workplace environment to further include virtual occupancy data associated with one or more users associated with one or more remote user devices, wherein one or more avatars associated with the one or more users are present within the one of the virtual rooms and the virtual occupancy data is updated to reflect the first user following the request to move the first avatar.

6. The method of claim 1, further comprising obtaining the physical occupancy data from one or more sensors proximate the one of the physical rooms.

7. A virtual workplace management device, comprising memory comprising programmed instructions stored thereon and one or more processors configured to execute the stored programmed instructions to:
   provide for display to a remote user device external to a workplace an immersive virtual workplace environment generated based on virtual workplace data, comprising images captured at physical locations within the workplace, and including virtual rooms corresponding to physical rooms of the workplace and a first avatar corresponding to a first user associated with the remote user device;
   modify one of the virtual rooms to include the first avatar and a first graphical indication proximate the first avatar indicating that the first user is remote, and determine that a second user is present within one of the physical rooms corresponding to the one of the virtual rooms based on physical occupancy data, following a request received from the remote user device to move the first avatar within the one of the virtual rooms;
   modify the one of the virtual rooms to include a second avatar associated with the second user and a second graphical indication proximate the second avatar indicating that the second user is local; and
   facilitate an interaction between the first and second users in response to a message received from the remote user device following selection of an interaction element displayed proximate the one of the virtual rooms.

8. The virtual workplace management device of claim 7, wherein the interaction comprises an audio, video, or text-based chat interaction and the interaction element is displayed proximate the one of the virtual rooms within an application executed by the remote user device via which the immersive virtual workplace environment is provided for display on the remote user device.

9. The virtual workplace management device of claim 7, wherein the processors are further configured to execute the stored programmed instructions to obtain the physical occupancy data from one or more of:
   a physical location correlated to the one of the physical rooms and determined from a local user device associated with the second user and executing an application via which another instance of the immersive virtual workplace environment is provided for display on the local user device; or
   a location input received from the second user via the application and comprising an indication of the one of the physical rooms.

10. The virtual workplace management device of claim 7, wherein the processors are further configured to execute the stored programmed instructions to transition between two of the images in response to the received request to move the first avatar, wherein the received request comprises a movement input received at a virtual location within the immersive virtual workplace environment and the virtual location corresponds to one of the physical locations.

11. The virtual workplace management device of claim 7, wherein the processors are further configured to execute the stored programmed instructions to generate the immersive virtual workplace environment to further include virtual occupancy data associated with one or more users associated with one or more remote user devices, wherein one or more avatars associated with the one or more users are present within the one of the virtual rooms and the virtual occupancy data is updated to reflect the first user following the request to move the first avatar.

12. The virtual workplace management device of claim 7, wherein the processors are further configured to execute the stored programmed instructions to obtain the physical occupancy data from one or more sensors proximate the one of the physical rooms.

13. A non-transitory computer readable medium having stored thereon instructions for hybrid virtual workplace integration comprising executable code that, when executed by one or more processors, causes the processors to:
provide for display to a remote user device external to a workplace an immersive virtual workplace environment generated based on virtual workplace data, comprising images captured at physical locations within the workplace, and including virtual rooms corresponding to physical rooms of the workplace and a first avatar corresponding to a first user associated with the remote user device;
modify one of the virtual rooms to include the first avatar and a first graphical indication proximate the first avatar indicating that the first user is remote, and determine that a second user is present within one of the physical rooms corresponding to the one of the virtual rooms based on physical occupancy data, following a request received from the remote user device to move the first avatar within the one of the virtual rooms;
modify the one of the virtual rooms to include a second avatar associated with the second user and a second graphical indication proximate the second avatar indicating that the second user is local; and
facilitate an interaction between the first and second users in response to a message received from the remote user device following selection of an interaction element displayed proximate the one of the virtual rooms.

14. The non-transitory computer readable medium of claim 13, wherein the interaction comprises an audio, video, or text-based chat interaction and the interaction element is displayed proximate the one of the virtual rooms within an application executed by the remote user device via which the immersive virtual workplace environment is provided for display on the remote user device.

15. The non-transitory computer readable medium of claim 13, wherein the executable code when executed by the processors further causes the processors to obtaining the physical occupancy data from one or more of:
a physical location correlated to the one of the physical rooms and determined from a local user device associated with the second user and executing an application via which another instance of the immersive virtual workplace environment is provided for display on the local user device; or
a location input received from the second user via the application and comprising an indication of the one of the physical rooms.

16. The non-transitory computer readable medium of claim 13, wherein the executable code when executed by the processors further causes the processors to transition between two of the images in response to the received request to move the first avatar, wherein the received request comprises a movement input received at a virtual location within the immersive virtual workplace environment and the virtual location corresponds to one of the physical locations.

17. The non-transitory computer readable medium of claim 13, wherein the executable code when executed by the processors further causes the processors to generate the immersive virtual workplace environment to further include virtual occupancy data associated with one or more users associated with one or more remote user devices, wherein one or more avatars associated with the one or more users are present within the one of the virtual rooms and the virtual occupancy data is updated to reflect the first user following the request to move the first avatar.

18. The non-transitory computer readable medium of claim 13, wherein the executable code when executed by the processors further causes the processors to obtain the physical occupancy data from one or more sensors proximate the one of the physical rooms.

* * * * *